（12）United States Patent
Meneguzzo et al.

(10) Patent No.: US 12,084,637 B2
(45) Date of Patent: *Sep. 10, 2024

(54) METHOD AND RELATIVE APPARATUS FOR THE PRODUCTION OF BEER

(71) Applicant: Cavitek S.r.l., Gualdo Tadino (IT)

(72) Inventors: Francesco Meneguzzo, San Miniato (IT); Lorenzo Albanese, Carmignano (IT)

( * ) Notice: Subject to any disclaimer, the term of this patent is extended or adjusted under 35 U.S.C. 154(b) by 98 days.

This patent is subject to a terminal disclaimer.

(21) Appl. No.: 17/806,800

(22) Filed: Jun. 14, 2022

(65) Prior Publication Data

US 2023/0167387 A1  Jun. 1, 2023

Related U.S. Application Data

(63) Continuation of application No. 17/324,602, filed on May 19, 2021, which is a continuation of application No. 16/322,942, filed as application No. PCT/IT2016/000194 on Aug. 9, 2016, now Pat. No. 11,261,411.

(51) Int. Cl.
| | |
|---|---|
| *C12C 7/04* | (2006.01) |
| *C12C 7/06* | (2006.01) |
| *C12C 7/20* | (2006.01) |
| *C12C 12/00* | (2006.01) |
| *C12C 13/02* | (2006.01) |

(52) U.S. Cl.
CPC ............ *C12C 7/042* (2013.01); *C12C 7/06* (2013.01); *C12C 7/205* (2013.01); *C12C 12/00* (2013.01); *C12C 13/02* (2013.01)

(58) Field of Classification Search
CPC ......... C12C 12/00; C12C 13/00; C12C 13/02; C12C 7/00; C12C 7/04; C12C 7/042; C12C 7/06; C12C 7/20; C12C 7/205; C12C 7/22; C12C 9/00; C12C 9/02; C12C 9/025
See application file for complete search history.

(56) References Cited

U.S. PATENT DOCUMENTS

| | | | | |
|---|---|---|---|---|
| 2008/0277264 | A1* | 11/2008 | Sprague | ............... C12M 21/12 |
| | | | | 204/157.9 |
| 2010/0104705 | A1* | 4/2010 | Gordon | ................... A23L 2/50 |
| | | | | 426/322 |
| 2016/0289619 | A1* | 10/2016 | Mancosky | ......... B01F 27/2722 |

* cited by examiner

*Primary Examiner* — Vera Stulii
(74) *Attorney, Agent, or Firm* — Themis Law

(57) ABSTRACT

A method, and related apparatus, for producing beer from any types of grains includes activating phenomena of controlled hydro-dynamic cavitation during all the steps of the process, from mashing to hopping, and possibly after yeast inoculation. The present method and apparatus provide a number of advantages over traditional techniques, for example, avoiding the pre-crushing of the malts or the grains, thereby increasing the efficiency of saccharification and of starch extraction, and avoiding the boiling at equal efficiency of the hopping. Another advantage is the opportunity of causing the concentration of gluten to fall in the final product simply with controlled hydraulic processes through electromechanics, and of possibly extending fermentation.

9 Claims, 10 Drawing Sheets

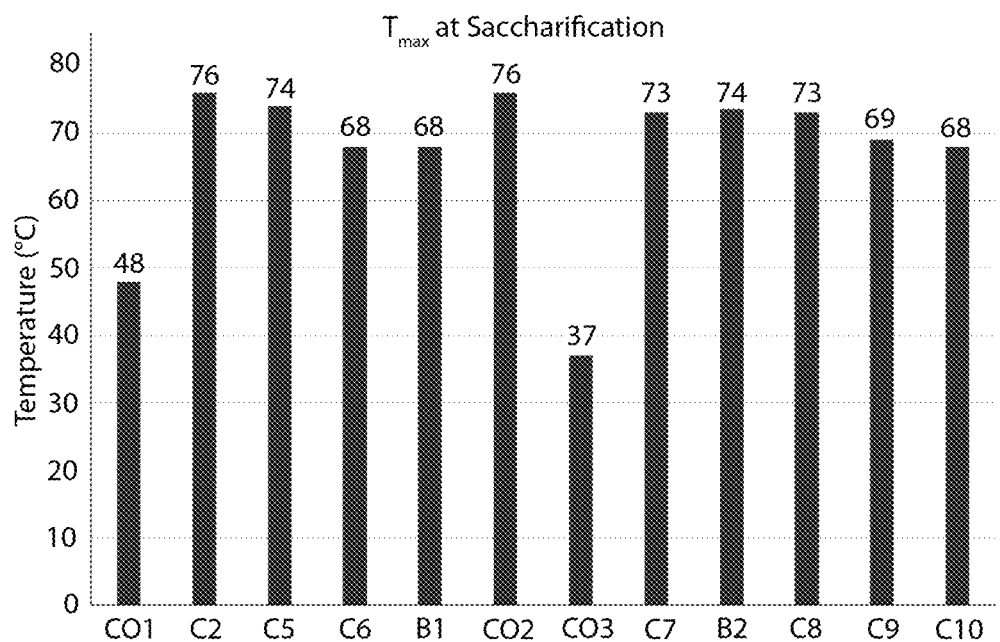
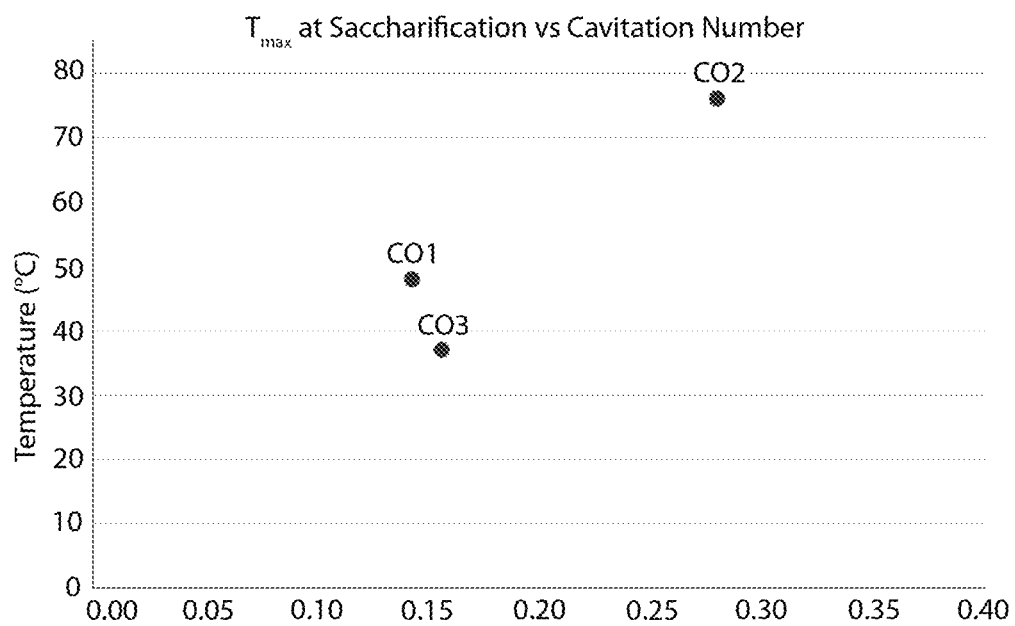

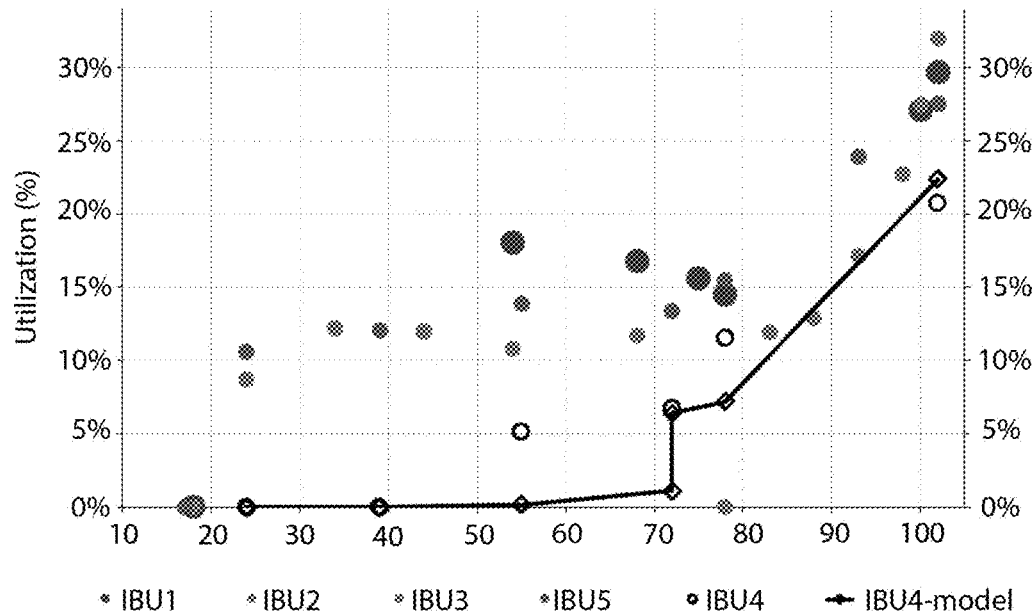
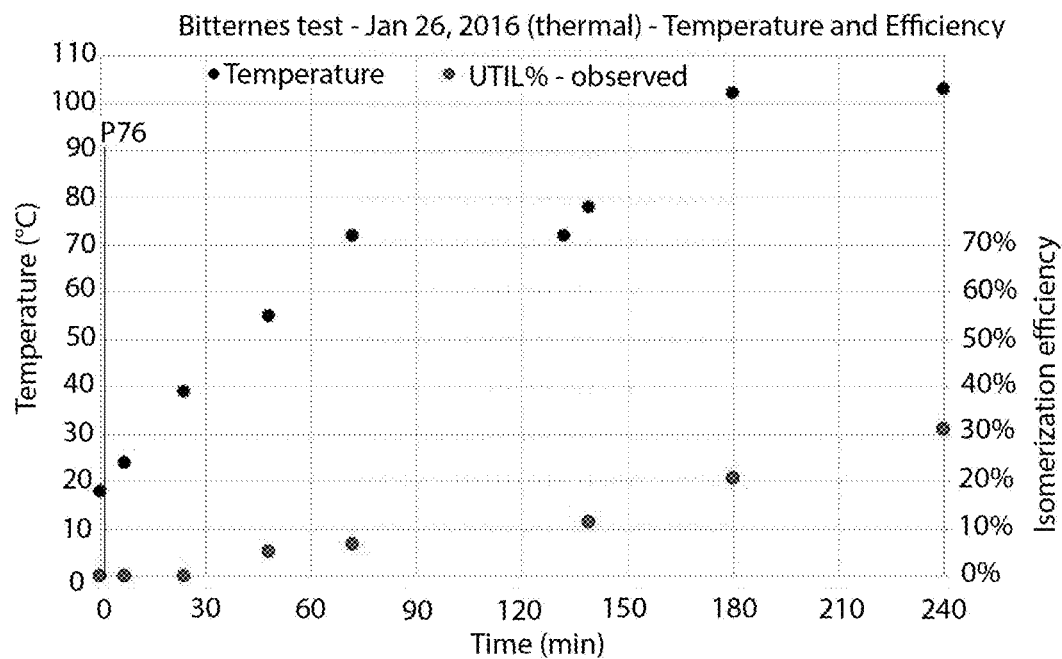

METHOD AND RELATIVE APPARATUS FOR THE PRODUCTION OF BEER

TECHNICAL FIELD

The present invention concerns the technical field relative to the production of beer.

In particular, the invention refers to an innovative plant, and relative process, that allows to produce beer simplifying or eliminating totally many of the preliminary processes necessary in the background art, though optimizing the qualities of the product, for example sensorial and nutritive, and therefore with costs of production/maintenance that are clearly inferior.

BACKGROUND ART

The process for the production of beer has been known for millenniums, and has remained more or less unvaried.

The process for the production of beer can be synthetized in the following phases, for example indicated in the references [Ambrosi et al., 2014 http://dx.doi.org/10.1007/s11947-014-1275-0; Pires and Brányik, 2015 http://dx.doi.org/10.1007/978-3-319-15189-2].

It is initially envisaged a phase of "Pre-grinding", usually under dry conditions, of the toasted corn or malt (typically malted and toasted barley, or "barley malt", but also some varieties of grain of other cereals, also not toasted or "raw"), finalized at increasing the exchange surface between the malt and the liquid (water) and therefore the transfer of fermentable sugars and enzymes.

It is then envisaged a phase of purification and sanitization of the water to be employed in the phase of mashing. The microbial pathogens must be removed, as well as other possible organic and inorganic contaminating elements, such as the herbicides. Also, the adjustment of acidity (value of pH) to the needs of the process of brewing can be executed in this phase.

The following phase is a phase of mashing, in which the mix of water and malts is taken to the suitable temperatures to favor the process of hydrolysis of the polysaccharides present in the malts into simple sugars and amino acids, assimilable by the yeasts during the fermentation. The heating—generally executed with electrical resistance or with free flame—can be executed directly on the entire volume, or on a part thereof, extracted and boiled and thereafter re-inserted in the original volume ("decoction"). In this phase it is necessary to maintain a vigorous stirring of the liquid by means of mechanical stirrers or hydraulic re-circulations, also to avoid caramelization effects of the sugary liquid mass and formation of potentially carcinogenic compounds, implying costs relative to the energy and realization complexity.

It follows then a phase of rinse of the malt (called also in the technical jargon "sparging"), finalized at the extraction of the residue sugars and of the must absorbed by the grains. This phase, realized by making water filter at the temperature of the must (around 78° C.), is particularly burdensome in terms of time.

It is then envisaged a phase of hopping and boiling the must, a stage that—after the removal of the malt abound at 78° C. (mashing-out) and a phase of further heating initiates with the introduction of the hops starting from at least 90° C., and is finalized at realizing some fundamental processes. In common practice, it is consolidated knowledge that by boiling for less than an hour there is the risk of not using completely the α-acids of the hop, therefore the level of bitter can result lower than desired. Further, the foam can result not well-formed due to the improper extraction of isohumulones of the hop. An intense boiling, generally for at least one hour, is necessary to bind the compounds of the hop to the polypeptides, forming colloids that remain in the beer and helping to form a stable foam. An open and intense boiling further helps to remove undesired volatile compounds, such as sour constituents of the hop, some esters and sulphur compounds (DMS). A vigorous boiling without the cover is important to permit that these substances do not condense and return in the liquor. Also, the limpidity is modified by an intense boiling: if it does not last at least one hour, there will not be an adequate hot break to remove the undesired proteins.

There are then envisaged the phases of fermentation, carbonation and maturation, which start at the moment of the inoculation of the yeasts, which generally consist of various strains of the *Saccharomyces Cerevisiae* type and others, into the cooled and ventilated must. Such inoculation must take place as quickly as possible in such a way as to avoid contaminations of the must, and the initial concentration of the yeasts is generally comprised between 15 and 20 millions of cells per ml of must.

It is then obviously necessary a process of cleaning and sanitation of the plants and of the environment, which implies a high waste of energy and above all of water, in a measure between 4 and 11 liters of waste water per liter of beer produced (values that increase as the capacity of the brewery diminishes), such waters being provided with high organic loads, usually in an amount between 2000 and 6000 mg/liter, so as to generally require a treatment in loco before the draining. Sometimes, the organic residues of the depuration of the waste waters, also together with the exhausted malts, are employed in loco or in centralized plants for the production of biogas, therefore of thermal energy and/or electric energy, through plants of anacrobic digestion.

The process, therefore, requires various working phases which are complex, require the input of a lot of energy and a high ordinary and extraordinary maintenance of the plants is required.

SUMMARY OF THE INVENTION

It is therefore the aim of the present invention to provide an innovative plant for the production of beer, and relative method, which solves said technical inconveniences.

In particular, it is the aim of the present invention to provide a plant for the production of beers from any type of grains (in an exemplifying and not limiting way, barley, grain or wheat, corn, sorghum, millet and rice) and also without the use of extracts ("all grain" beers), which simplifies significantly the traditional productive process, eliminating or simplifying some necessary productive and maintenance phases with traditional plants, allowing at the same time to obtain an optimal product, as well as a product with a very low content of gluten, even using grains that are particularly rich in it.

These and other aims are therefore obtained with the present plant for the production of beer, as per claim 1.

In accordance with the invention, such a plant (31) for the production of beer comprises at least one section having:
  A tank (7) for the containment of a mix of liquids or liquid and solid parts, for example water and the not pre-crushed malt in the mashing phase;
  A circulation path (2, 3) connected to the tank (7) in such a way that said mix can circulate many times from the tank along said path to be directed again into tank (7) while exiting from said path;

At least a pump (1) that causes the movement of the mix along said path;

And wherein said circulation path (2, 3) comprises at least one cavitation reactor (2) configured to generate a controlled hydrodynamic cavitation process (called in the technical jargon "CHC"), for example through the presence of a section of restriction through which the obliged passage of the mix with consequent generation of cavitation takes place.

The plant, in accordance with claim 1 mentioned above, allows to solve, in particular, the following technical problems.

First of all, the need to pre-mash the malt, or grains of any type, under dry conditions before the insertion, is now eliminated.

In fact, the passage of the mix through the cavitation reactor causes a cavitation to be generated that takes both to an increase of temperature of the mix and to a mashing itself of the grains until the pulverization thereof. The cavitation bubbles that collapse generate locally, on spatial scales generally between a hundred of nanometers and tenths of micrometers, both violent local waves of pressure and intense hydraulic jets, which result in the crushing of the grains.

While the energy in entry into the apparatus is provided by the impellers of the pump, the main local heating source is represented by the cavitation itself that therefore, as said, is responsible for the increase of temperature in the mix itself and therefore, in accordance with such a solution, external burners are not necessary.

Moreover, the need for mechanical stirrers is eliminated. The plant in fact is provided with said pump that activates the circulation through the cavitation path that, it itself together with the cavitation processes, creates an effect that impedes the caramelization of the mixt and/or the formation of lumps. In this way, external stirrers are not necessary and the plant results structurally simpler.

With the plant, as claimed, there is also a drastic reduction of the need for cleaning and sanitizing the plant itself and the work environment, with a consequent reduction of the overall working times. This is in fact due to the fact that possible residual pathogen agents, harmful for human health and for the quality and stability of the beer, present in feed water, shall be advantageously degraded and neutralized in the course of the hydrodynamic cavitation processes, therefore increasing food safety of the beer and possible infections in the body of the plant and in the work environment.

A single plant unit, as claimed, allows a direct scalability from a few hundreds to many thousands of liters per production session, without modifications in the working times.

Further, there is a containment to inferior values of the highest process temperatures and therefore it is possible to eliminate the phase of boiling, thanks to the completion of the processes of expulsion of the dimethyl-sulphides (DMS), of sanitation and of extraction of the bitter from the hops within a temperature of 100° C. or anyway within the boiling point.

The present plant has been found efficient for obtaining beers with a very low content of gluten (<100 ppm) or without gluten (<20 ppm) without modifying the recipes, therefore using, for example, barley malt at a 100% and without alterations of the fragrance, taste, maintenance and perlage of foam.

Similarly, it is also described here a method for the production of beer comprising a phase, which can be, for example, of mashing as well as of hopping, which envisages:

Arrangement of a mix of liquid, preferably water and malt inside a tank (7).

The mix can, for example, envisage only liquid or also liquid and hops in the hopping phase or liquid and non pre-crushed malt in the mashing phase and in any case it can also be prepared directly inside the tank or prepared and then poured inside the tank.

It is then envisaged the phase of movement, by means of at least one pump (1), of said mix along a circulation path (2, 3), said circulation path being connected to the tank (7) in such a way that the mix can be inserted from the tank along said path to be directed again inside the tank (7) at the exit from said path.

In accordance with the invention, the path comprises at least one cavitation reactor (2) configured in such a way that it generates a hydrodynamic cavitation process.

Such hydrodynamic cavitation process represents the main internal heating source of the mix.

In this way, as said, the process is simplified since, if for instance used in a mashing phase, it is not necessary to pre-mash the malt and, in any case for any phase in which a high increase of temperature is required, external burners or external heat sources are not necessary. The same pressure waves and mechanical jets provide for the crushing of the malt.

Further advantages can be deduced from the remaining dependent claims.

BRIEF DESCRIPTION OF THE DRAWINGS

Further features and advantages of the present plant and relative method, as per the invention, will result clearer with the description that follows of some preferred embodiments, made to illustrate but not to limit, with reference to the annexed drawings, wherein.

FIGS. from 8 to 11 show some experimental results.

DESCRIPTION OF SOME PREFERRED EMBODIMENTS

As described below, the plant as a whole can be formed of more sections located in fluid communication among them, or the presence of a single section configured to be able to execute all the working phases envisaged could be enough.

Figure 1:
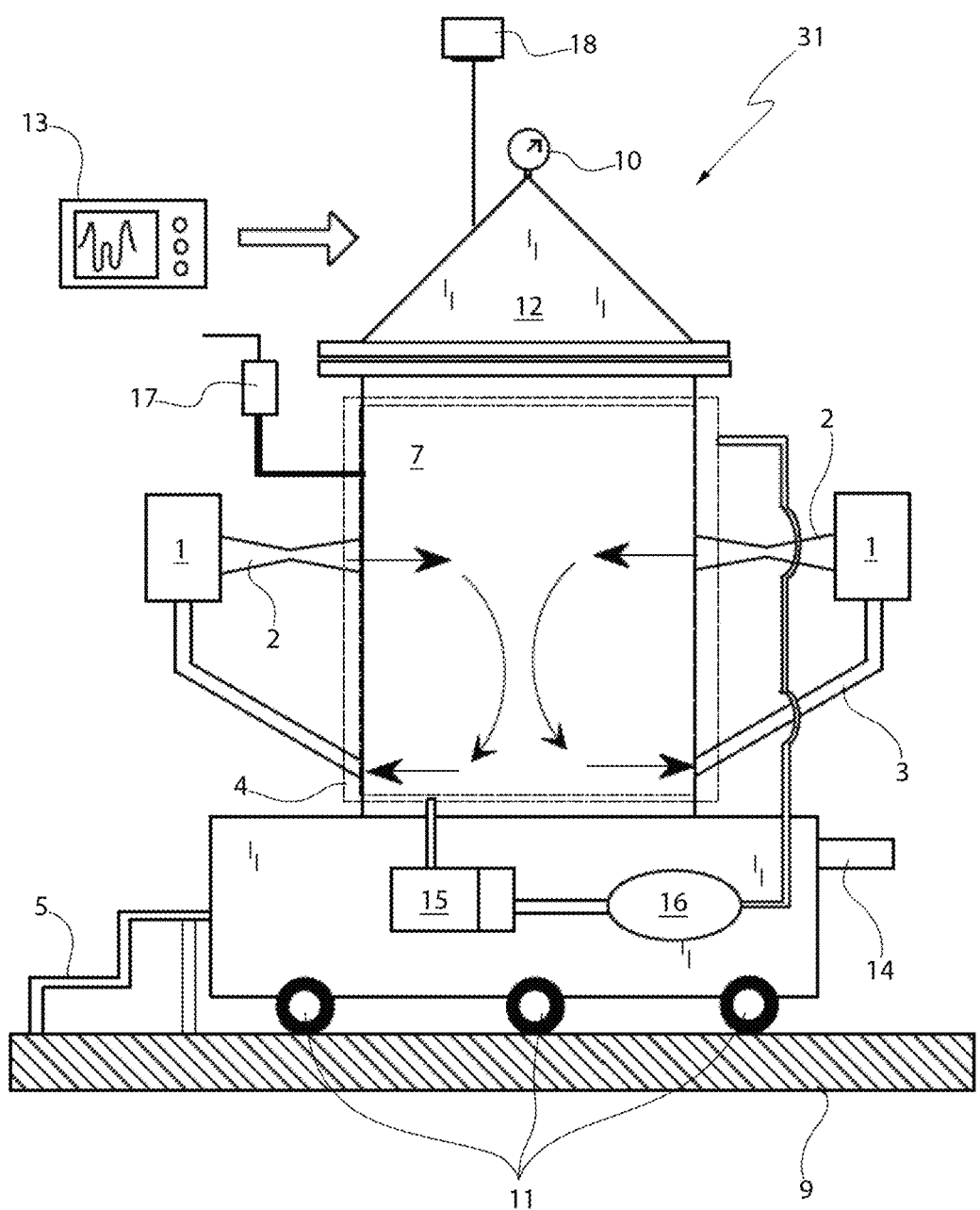
FIG. 1 shows a lateral view of the plant for the production of beer, as per the present invention.

FIG. 1 therefore shows in a schematic lateral view a first section of the plant in accordance with the present invention, which is specific for the operation of mashing even if, as clarified below, such a section could operate other different phases, such as the hopping and/or the fermentation phase.

The figure shows with number 9 a platform support for such a section or a generic support surface.

The section can be provided with rotatable wheels 11 which allow a certain mobility, according to the dimensions thereof, thus rendering it transportable and mobile.

Figure 2:
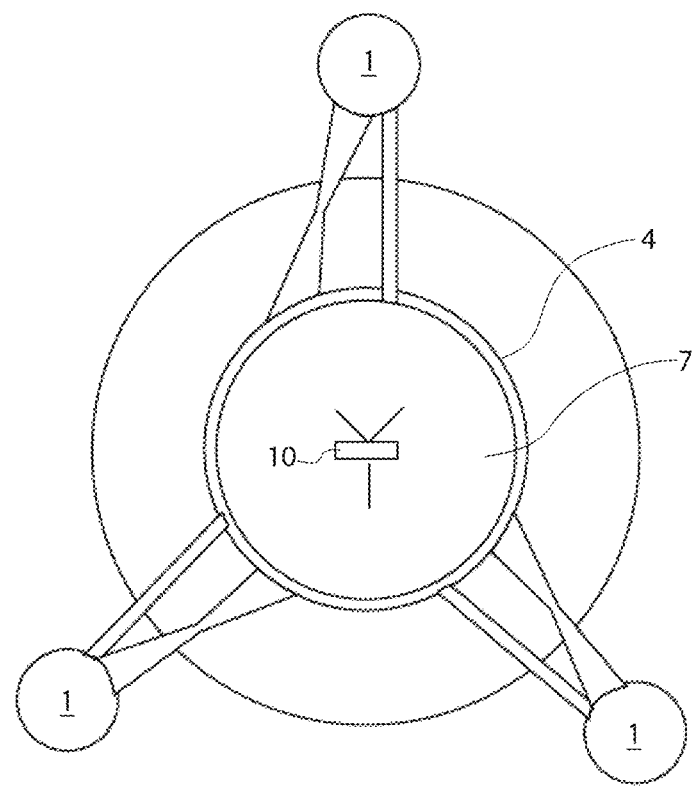
FIG. 2 is a top view of the plant represented in FIG. 1.

Going further into the detail of the invention, such a section of FIG. 1, represented also in a top view of FIG. 2, envisages a tank 7 for the containment of the mix for the production of beer, for example the must, the mixes of liquids necessary for the process or, more specifically, the mix of water and non pre-crushed malt. The tank is schematically shown in the tops view of FIG. 2.

Always as shown in FIG. 1 and FIG. 2, one or more pumps 1 are then envisaged, preferably of the electro-pump type, such as centrifugal pumps.

As shown in the top view of FIG. 2, the pumps are preferably in an overall number of three, are arranged at an angulation of about 120 degrees one from the other one around the tank 7, and the axis of the delivery branch 2 is approximately tangential with respect to the contour of the tank 7. The use of three pumps arranged in such a manner confers the advantage of a sufficiently quick and complete working of the must. Naturally, a different number of pumps could be used according also to different angulations, preferably but not limited to according to a symmetrical angular arrangement and with the axis in the delivery branches arranged tangentially with respect to the contour of the tank 7.

Going on with the structural description of the invention, as also shown in FIG. 1, the pumps control a circulation of the mix in processing through a path that comprises a return conduit 3 that converges from the tank 7 to the pump 1 and a delivery 2 that connects the pump 1 to the tank 7 and, through this, to the return 3. Such delivery comprises a cavitation reactor 2 in the form of a Venturi tube 2 that through the tank 7 is connected to the return conduit 3.

For each pump at least one Venturi conduit is therefore envisaged and the number of Venturi conduits is not therefore inferior with respect to the number of pumps.

In this way, as also clarified below in the present description, regarding the functioning of the plant, a circulation of the fluid is created that from the tank 7 is aspirated through the normal return conduit 3 to be reinserted in the tank 7 through the Venturi tube 2.

The Venturi tube notoriously forms a restriction section to then re-widen, obliging the fluid to suffer a sudden acceleration that, in turn, causes a cavitation phenomenon. The circulation along such a path is maintained through the activation of said electro-pumps 1, so a continuous circulation is obtained with a continuous formation of cavitation for all the time in which the pumps that generate the flow are activated (time that depends on the working process in said mashing phase, as well as in the subsequent phases).

The passage through the narrowing of the Venturi tube determines such hydrodynamic cavitation that is at the basis of the working process of beer, as per the present invention.

The cavitation process frees energy in the liquid and causes, as a consequence, a rise of the temperature at the basis of the mashing process without the request for further thermal energy inserted in the system. The same cavitation causes the crushing of the malt, as well as of any variety of also non malted grain, directly in water, to form a must in which the malt yields the own content of starch and enzymes without the need for a process of pre-mashing. The same cavitation, further, impedes the formation of solid residues and of caramelization, therefore rendering the use of stirrers superfluous in such section.

The continuous formation of bubbles and the subsequent collapse thereof, as known, frees pressure waves and hydraulic jets that are at the basis of the rise of temperature of the liquid and also of the destruction of the solid particles of malt that in this way pulverize, favoring the extraction of malt and enzymes thereof for the formation of the must.

The entire apparatus is therefore innovative since operating in a hybrid regime, envisaging the volumetric heating of the circulating liquid through the mechanical energy released by the pumps 1 and the activation of different cavitation regimes. In this way, the reactions of release of starch by the malts and of bitter by the hops are activated (in case, as clarified below, a similar section is used in the hopping phase), as well as the further processes that cause the breakdown of the gluten, directly and/or following the inoculation of the yeasts necessary for the fermentation phase, without the need for external sources such as resistances and burners.

A suitable control of the cavitation process allows therefore to obtain the temperatures necessary for the process of production desired.

In order to allow the maintenance of pre-determined temperatures, the plant, as shown in FIG. 1, can advantageously envisage a cooling jacket 4 that surrounds the tank, visible both in FIG. 1 and in FIG. 2 (in FIG. 1 the jacket is represented with a dotted line in order not to hide the underlying view of the tank). In said cooling jacket circulates cooling fluid, by way of example but not limited to glycol, contained in a further tank 16, whose circulation is activated by a further re-circulation pump 15.

Said cooling jacket can anyway be equivalently substituted by a coil inserted into the tank 7 and in contact with the must.

In this way, it is possible to activate such cooling jacket, or the coil, to maintain the temperature at the values desired each time according to the operative protocols envisaged for the different recipes used and types of beer desired.

As said, the cavitation reactor 2 is preferably in the form of a Venturi tube since the use of a Venturi tube has the advantage of optimizing per se the process of hydrodynamic cavitation, preserving the structure from mechanical shocks and, presenting a single narrowing of a sufficiently wide section, avoiding blocking phenomena.

In a variant of the invention, the cavitation reactor 2 must not be necessarily in the form of a Venturi tube but it can also have other alternative solutions, preferably but not in a limiting way, of the stationary type.

For instance, the Venturi tube could be substituted with perforated plates through whose holes the passage of the mix to cause the cavitation is obliged.

There exist, and they should in fact be used, also dynamic systems to generate cavitation but these, even if usable for the present invention, are naturally more complex and more expensive.

The section described in FIG. 1 and FIG. 2 can be of the open type, that is without lid, therefore being always subject to the atmospheric pressure.

The configuration shown in FIG. 1 and in FIG. 2 envisages anyway a closure lid 12 with a manometer 10 to read and obtain the pressure value, as well as one or more ordinary safety valves 18, placed at the top, for the exit of the gases dissolved in the water and in the must, included the DMS.

Therefore, through the rise of temperature within the tank 7 with the cavitation, an increase of pressure of the liquid contained inside of it is caused. In the closed configuration it is necessary to avoid over-pressures and for such a reason, as shown in FIG. 1, a valve of release of the pressure 17 is envisaged that allows the exit of liquid to maintain the pressure at pre-defined constant values. The same closed configuration, provided with lid 12, can be also innovatively advantageous, when applied in the system described of production of beer based on the cavitation phenomena, because it allows, through obtaining hydraulic pressures also very superior to the atmospheric one and until the maximum value allowed by the valve of release of the pressure 17, the adjustment of the cavitation regime in a much wider interval with respect to the one imposed by the single variation of the temperature, which, as it will be clearer below, allows in turn to improve the efficiency of various phases of the process.

As said, the section described in FIGS. 1 and 2 is particularly suitable for the phase of productive process corresponding to the mashing with freely circulating malts and therefore directly subjected to the hydrodynamic cavitation processes, as well as inserted without being subject to any phase of dry pre-crushing—nevertheless, usable also for the execution of the subsequent phases of hopping and fermentation.

The overall volume of liquid circulating in the section, expressed in liters and contained in the tank 7, is comprised in the interval preferred but not limiting between 15 and 30 liters per each kW (kiloWatt) of overall nominal mechanical power of the electro-pumps installed, as advantageous compromise between the electrical power which must be installed for the purposes of the heating speed and of the activation of the cavitation regimes desired, and the production times.

The cavitation reactors 2, either in the form of Venturi tube or of perforations present in plate, can be arranged both in the delivery branches of the respective electro-pumps 1, as in FIGS. 1 and 2, and in the return branch 3. In the case of arrangement of such reactors 2 along return branches 3, the distance between the narrowing of the Venturi tube, or of the perforated plate, or of any other section of acceleration of the liquid treated, and the mouth of aspiration of the electro-pump must be, preferably but not limiting, superior to 40 cm, in such a way as to avoid damages to the impeller of the pump, produced by the cavitation phenomena started in the reactor 2.

Figure 3:
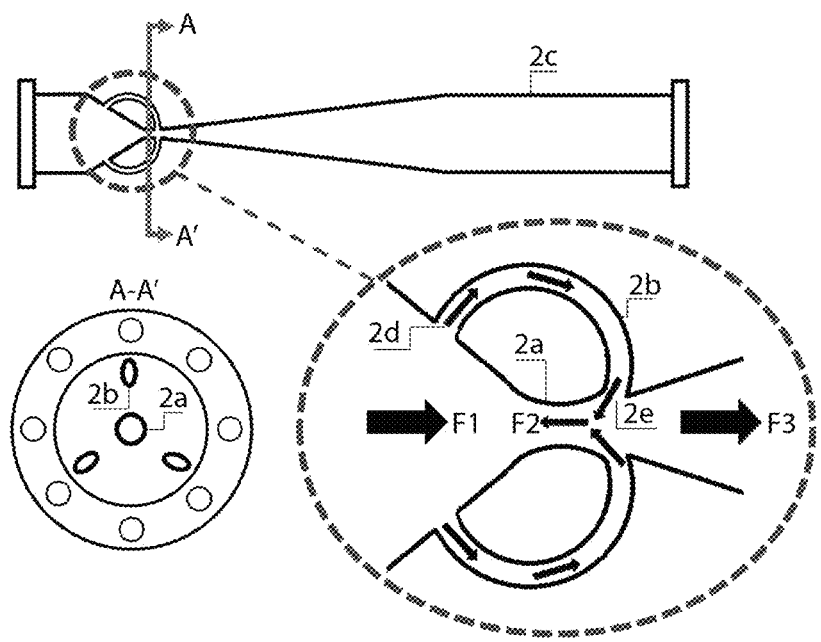
FIG. 3 represents a realization variant of the cavitation reactor, for example in the form of a Venturi pipe or also in other forms, which envisages convergent secondary flows near the section of the relative narrowing. The phases of acceleration of the flow (F1), of generation of the cavitation bubbles (F2) and of growth and collapse of said bubbles (F3) in the subsequent expansion by exiting the narrowing are highlighted.

A realization variant of the reactor 2, finalized at the increase of the hydro-cavitation phenomena associated, as well as to reduce the level of noise produced in the operative phase, derives from a solution as shown in FIG. 3.

It envisages the convergence in the section of the narrowing (2a), or immediately downstream of said section, preferably but not limiting at a distance not superior to 2 cm downstream of said section, of further secondary flows, directed through pipes (2b) of inferior section with respect to the one of the main circulation pipe (2c), having the relative inlet mouth (2d) upstream of said narrowing section. The number of such secondary flows must be at least equal to two and preferably, but not limiting, at least three. The maximum number of said secondary flows is linked only to limitations of technical or realization type; the outlet mouths (2e) of said secondary flows must also be all arranged at the same distance from said narrowing section 2a; likewise, the distance between consecutive outlet mouths (2e) must be the same, in such a way as to form a symmetric arrangement.

In order to obtain an optimal cavitation for the productive process, it has been found that the delivery capacity of each of the same pumps, at the relative nominal mechanical power, is preferably, but not limiting, comprised between 400 liters per minute and 1200 liters per minute, anyway such as to produce, preferably, a number of cavitation phenomena (NC) comprised, under atmospheric pressure, between the values of 0.1 and 1.

Such NC is expressed as in equation (1):

$$NC=(P_0-P_v)/(0.5 \cdot p \cdot u^2) \quad (1)$$

where $P_0$ is the average pressure downstream of the reactor (for example, equal to the atmospheric one), $P_v$ is the pressure of steam of the liquid, p is the density of the liquid and u is the speed of the flow determined by said carrying capacity of the pump connected to the cavitation reactor, all said quantities expressed in SI units (meters, kilograms, seconds).

Figure 3A:
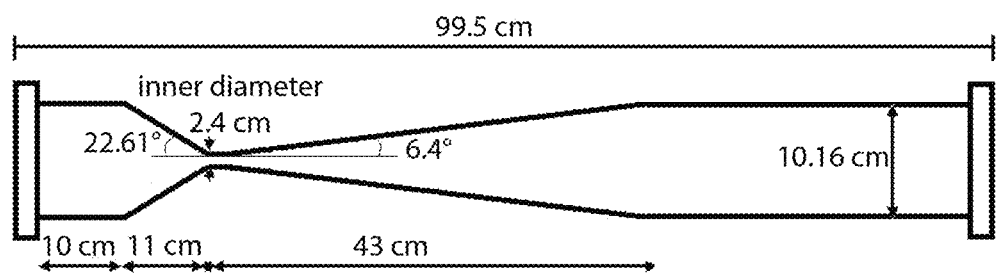
FIG. 3A shows preferred dimensions for the realization variant in the form of a Venturi tube.

The best results for the purposes of the cavitation regimes desired and of the control of the cavitation phenomena themselves have been obtained using for the Venturi tube 2 the geometry, preferred but not limiting, represented again in FIG. 3A, in said geometry, the area of the restriction section of the Venturi tube 2 is equal to 452 mm², that is 6.05% of the area of the maximum section of the same pipe. The preferred, but not limiting, tolerance of the relation between the areas of the section and the maximum one of the Venturi tube, as well as of the angles indicated in the same FIG. 3A, is equal to 10%.

As already said, the cavitation could anyway be obtained also with dynamic mobile devices, known and present on the market and therefore not necessarily through a fixed restricted section, such as the Venturi tube or perforated plates.

Naturally, the "static" solutions are extremely much simpler and economical.

In case of use, preferable but not limiting, of centrifugal pumps, the rotor of each of such pumps is preferably, but not limiting, open, and the length of the rotor itself is preferably, but not limiting, superior to 160 millimeters, since beyond such last limit further and advantageous cavitation phenomena are generated also in the flow dragged by the blades of the rotor itself.

As shown also in FIG. 1, the entire process can be controlled and managed automatically by an electronic card PLC 13, connected to one or more ordinary temperature sensors, to one or more manometers 10, preferably but not limiting to automatic estimate systems of the degree of saccharification and to gravimeters for the measurement of the concentration of starches and sugars of the must.

Always with reference to FIG. 1, with number 14 is indicated the total draining of the tank 7 and with number 5 a simple access ladder to the loading bed of the tank for possible inspections.

Figure 4:
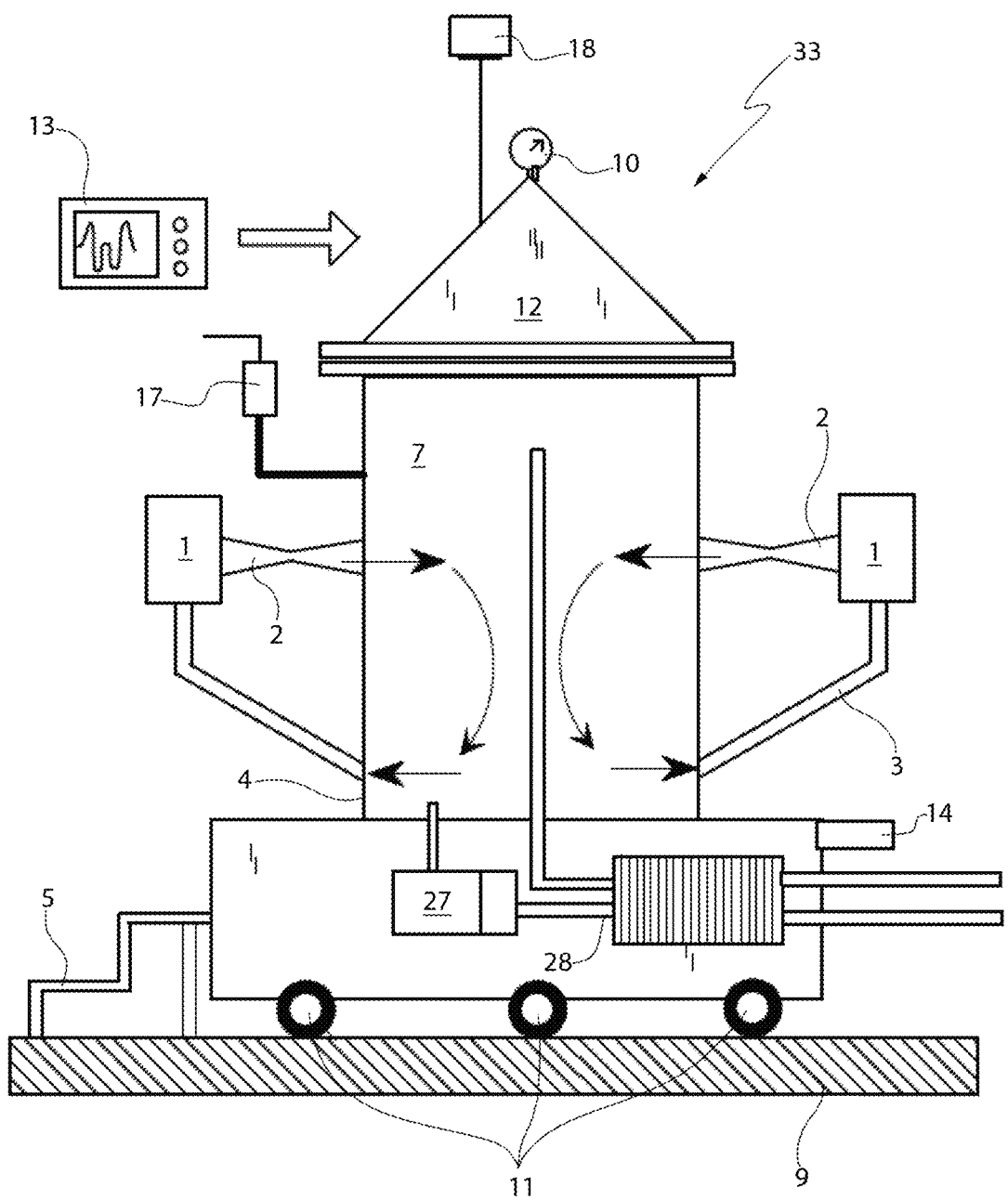
FIG. 4 shows a subsequent hopping section.

As said above, such section could be used in the same way also for the phase of hopping also if FIG. 4 shows a specific section for such phase of hopping.

The advantage of using a further section of hopping 33, separated by the preceding one of mashing 31, allows the execution without interruption of further processes of mashing. Such last section of apparatus destined to the hopping, if employed, will receive the must that passes by the section of mashing to a centrifuge 32 to realize a filtration.

Figure 5:
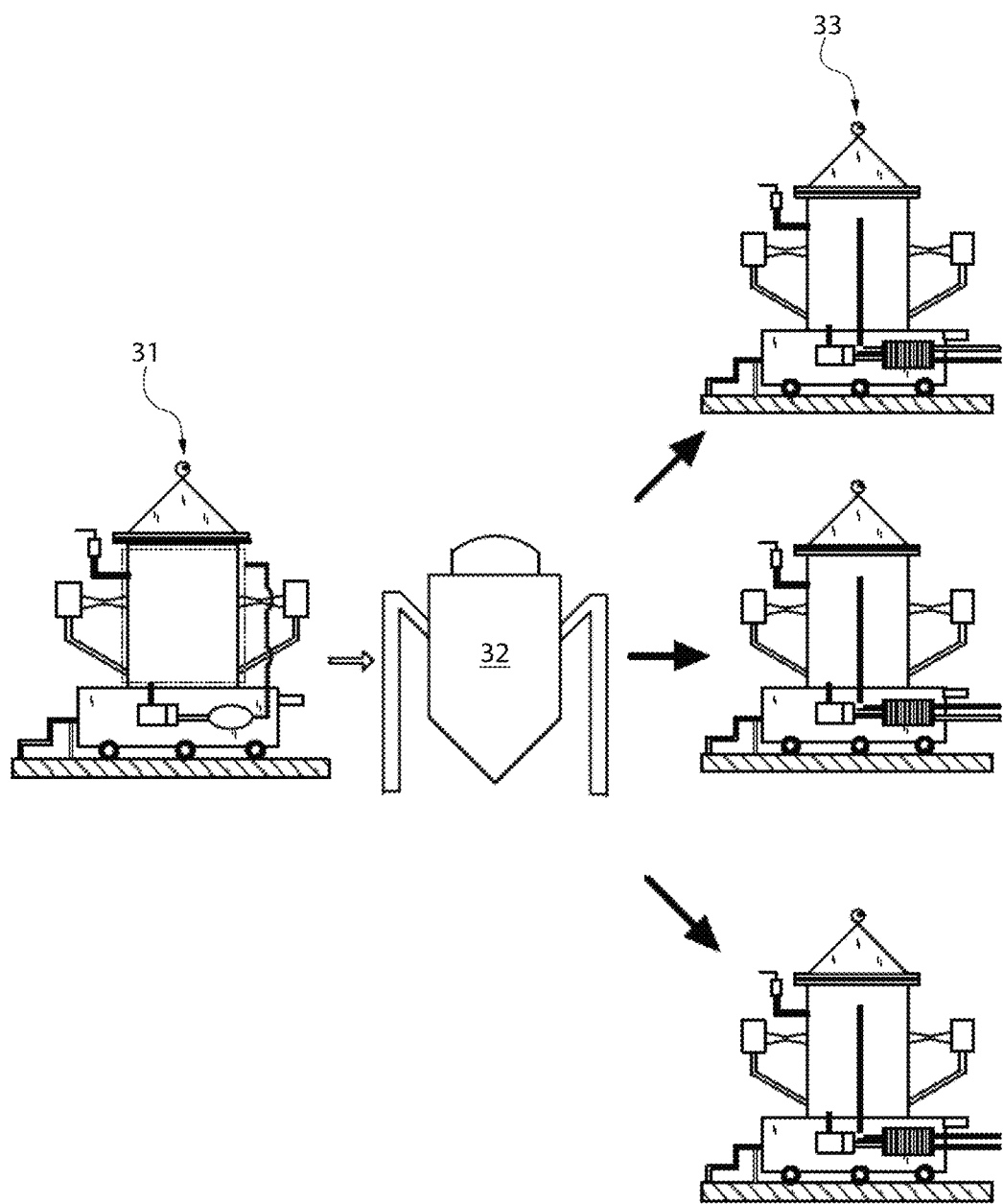
FIG. 5 shows the plant as a whole where the mashing section 31, a centrifugation section 32 and a hopping section 33 are located in succession.

FIG. 5 in fact shows the three sections in succession, as described below.

The intermediate section of filtration must not necessarily take place by centrifugation.

In any case, the plant of centrifugation can be an ordinary commercial plant of easy availability on the market.

The filtration eliminates the most part of the solid residues of the circulating malts. Moreover, the preceding section has in fact pulverized the solid malt. Thanks to the drastic reduction of the concentration of solid residues, in the segment of apparatus represented in FIG. 4 (that is the section of hopping) the thermal stabilization of the must, following the insertion of the hops, as well as the subsequent cooling at the end of the hopping, can be realized through simple re-circulation of the must itself, activated by one or more re-circulation electro-pumps 27, including the passage through a heat exchanger 28, preferably but not limiting realized in the form of a plate exchanger.

Basically, such section 33 envisages the cavitation reactors and the pumps as exactly in the section of mashing 31 either to rise the temperature to the value requested, or for the extraction of the α-acids from the hops, for the hopping process. The section can include, in addition, a cooling device that has to break down quickly the temperature in accordance with the process of production of beer, also for proceeding with the subsequent phases of fermentation, carbonation and maturation.

Precisely in virtue of the fact that, at this point of the production process, the solid parts are already inexistent (consider that the hop is introduced in proportions of a few hundred grams per each hundred liters of must), then for the sudden cooling said direct thermal exchange cooling system of the circulating must can be used, wherein the electro-pump 27 aspirates the must itself along a conduit that enters in the exchanger 28 where the conduit of cooling fluid converges.

Naturally, equivalent cooling systems, which do not envisage necessarily a heat exchanger that moves the must, can be used without for this moving apart from the present invention, for example the same jacket 4 of the section of FIG. 1 or a coil inserted in the must.

All the other components of the hopping plant are totally analogous to those employed in the segment of apparatus destined to the mashing and represented in FIG. 1 and FIG. 2 and, for that reason, the same reference numbers have been used in the figures.

Therefore, the rise of temperature desired in the phase of hopping is obtained in an equivalent manner to the one described, that is through the cavitation. The necessary quick temperature reduction takes place by activating the heat exchanger or other cooling system that may be envisaged.

FIG. 5 shows the possible three sections placed in succession that constitute the plant as a whole.

The section identified with number 31 is the one specific for the phase of mashing (therefore possibly lacking the cooling system to quickly reduce the temperature but in any case provided with a cooling system of exchange with a closed-circuit circulating cooling liquid to allow the realization of the thermal profiles envisaged by the protocols relative to the different recipes used and types of beer desired).

The sections with number 33 are those of hopping, described also previously, and that are substantially identical to the section 31 except for the fact that they include a cooling system to reduce the temperature that is generally different with respect to the one of the section 31.

Between them a centrifugation section 32 is interposed which, as said, is well known in the state of the art.

According to said embodiment, the tanks of the must in the segments of the apparatus destined to the hopping 33 will have, each, preferably but not limiting a volume that is inferior with respect to the tanks of the must of the segment of apparatus of mashing 31 because the volume of the must for the hopping has been previously deprived of the malts, resulting in an inferior volume.

It is further preferable, but not limiting, to have for safety reasons more than one unit of the segment of apparatus of hopping 33 since it is necessary to immediately bring the must, after the mashing and the centrifugation, to a unit of hopping, so as to avoid cooling phenomena and eventual contaminations.

The flows of the must between the three segments of apparatus 31, 32 and 33 can be easily handled in an automatic way according to common industrial standards, including the circulation pumps that connect the three segments. Moreover, all the parts and the components of the apparatus in contact with the must are realized in inox steel for the food industry, preferably but not limiting shone in order to minimize the scales, in particular of the exhausted residues of the hops, or in another material suitable for food provided that it is capable of supporting the hydraulic pressures possibly necessary to obtain the cavitation regimes desired.

In use, therefore, the plant described works as follows:

The mix of water and malt according to the proportions known in the production of beer is inserted in the tank 7 of the section of mashing, being possible to insert the malt from the beginning of the process, or at specific temperatures during the heating of the water in the segment of plant 31, according to specific recipes and as is known in the state of the art of production of beer. Nevertheless, surprisingly, it has been found that, with the characteristic process of the segment of plant 31, no differences in the final product are found, even inserting the malt from the beginning of the process itself. Then, the pumps 1 are activated in such a way as to cause the circulation of the mix, or of the single water in case of subsequent insertion of the malt, along the delivery and return path and therefore causing the cavitation that rises the temperature and fragments the malt.

The ideal temperature reached is maintained for the process in question and for the necessary time, in particular, preferably but not limiting, in order to optimize the extraction of the starch from the malt, the must should be maintained at temperatures comprised between a minimum comprised in the range between 60° C. and 65° C., and a maximum comprised in the narrower range between 72° C. and 75° C., and anyway preferably without exceeding the maximum value of 75° C., for a quantity of time corresponding to the electricity consumption for the activation of the electro-pumps equal to at least 3 kWh for each hectoliter of circulating must, after which the must should preferably be heated until the temperature of 78° C. for the block of the enzyme activities, to proceed then with the extraction of the malt through the segment of filtration 32.

Subsequently, therefore, the must is centrifuged, or anyway purified with other traditional systems, from possible residues, to then pass to the phase of hopping that can take place in the same section (if provided with a quick cooling plant) or in specific separate section, identical to the section of mashing but provided with a quick cooling system.

In such phase of hopping the rise of temperature is again envisaged in accordance with said phase, which, surprisingly and advantageously, as already mentioned, has been found to be able to be limited to the rise of the boiling point, generally around the 102° C., avoiding the subsequent phase of boiling which is instead necessary in the traditional processes. Therefore, the must will be preferably heated without interruptions and preferably without activating the cooling system until the boiling point. In the same phase, moreover, the insertion of the hops can be executed from the beginning, independently from the starting temperature, and anyway preferably but not limiting in such a way that the time of permanence in the must of the hops is equal to at least 10 minutes during heating. Once the boiling point has been reached, the pumps will be de-activated, while the quick cooling system will be activated, in order to suddenly bring down the temperature until the characteristic values for the survival of the specific yeasts to be inserted immediately after for the subsequent phase of fermentation, such characteristic values of temperature being, for example, comprised between 17° C. and 28° C. In order to minimize the risks of contamination of the must, said cooling should preferably but not limiting be inferior to 20 minutes and anyway not superior to 30 minutes. It is important to note that, as designed, and in particular if the axis of the delivery branches 2 are approximatively tangential with respect to the contour of the tank 7, the plant does not need systems suitable to create whirls and whirlpools, often present in the traditional apparatuses in order to collect at the bottom of the tank of hopping various proteins and residues, including those of the malts and of the exhausted hops.

There are then envisaged the phases of fermentation, carbonation and maturation, which start at the moment of the inoculation of the yeasts, generally belonging to various strains of the *Saccharomyces Cerevisiae* type and others, in the cooled and ventilated must. Such inoculation must take place, as said, as quickly as possible so as to avoid contaminations of the must and for that reason said cooling plant is necessary to quickly bring down the temperature of the boiling point (generally around 102° C. reached in the phase of hopping to said characteristic interval of temperatures necessary for the survival of the yeasts (for example, comprised between 17° C. and 28° C.).

Figure 6:
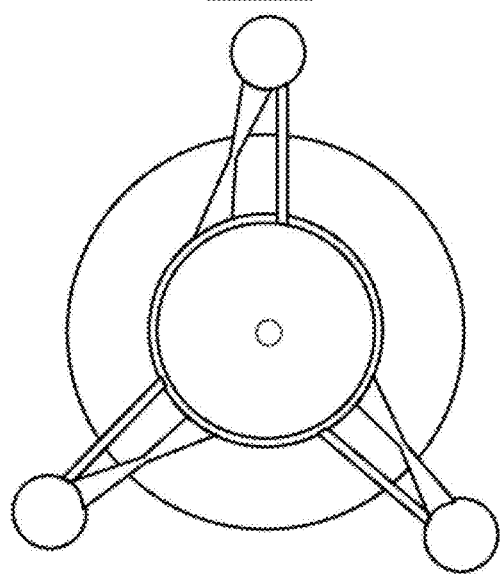
FIGS. 6 and 7 show a variant of the invention with a basket of containment of the malt or of the grains, insertable/removable into/from the tank.
Figure 7:
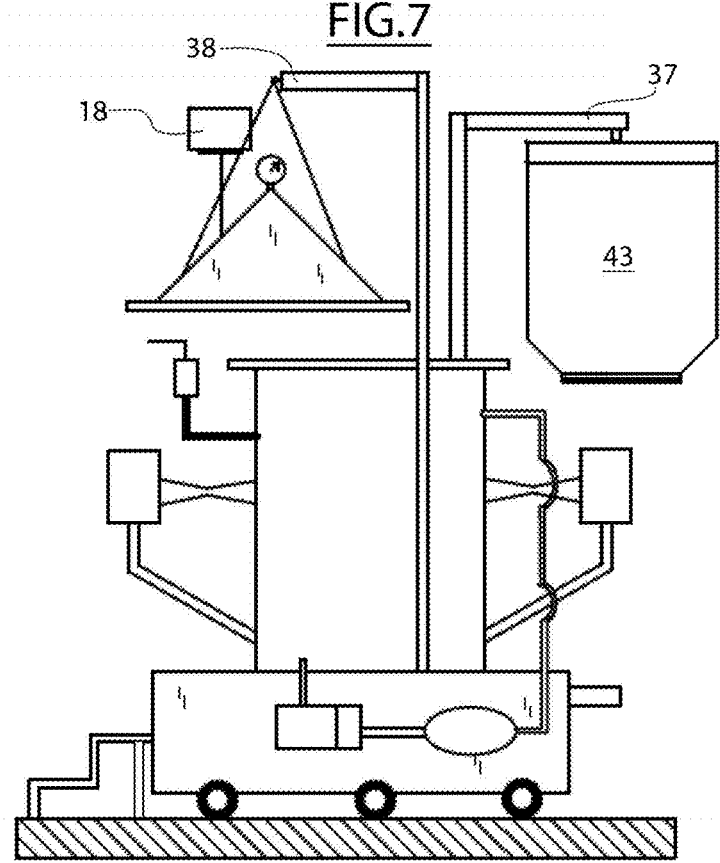

A variant of the invention is shown with reference to FIG. 6 and FIG. 7. Such variant refers to the phase of mashing and is to be eventually considered substitutive of the segment of plant 31.

In such configuration, the malts are not freely circulating but contained in a basket 43, of perforated mesh, therefore not directly subjected to the cavitation phenomena and they are not crushed and pulverized. For this reason, the malts themselves must be previously pre-crushed before the relative insertion in the basket 43, in order to obtain a transfer of the starches from the malts that is sufficiently quick and efficient, even if anyway in a generally inferior measure with respect to the preferred embodiment of FIG. 1 and FIG. 2.

In any case, the increase of temperature is obviously obtained in an equivalent manner to what has been previously described for the other embodiments.

Although the first embodiment described is the preferred one because it produces the fastest and most efficient transfer of the starch and eliminates the phase of pre-crushing, such further embodiment with the basket has, however, the advantage of applying the same principle of the cavitation for the purposes of all the other effects, including the rise of temperature, even if a subsequent centrifugal section is not available.

FIG. 6 and FIG. 7 show, therefore, a winch 37 for the lifting and the movement of the basket 43 and a winch 38 that serves to remove the lid of the tank 7. All the other components are present exactly as in the other embodiments, except the stabilization system of the temperature and cooling that, thanks to the fact that the malts are excluded from the circulation, can be realized as in the form used in the segment of plant 33 destined to the hopping, that is with direct-recirculation of the must through a heat exchanger, for example with plates.

In the variant exemplified in FIG. 6 and in FIG. 7, the basket 43 can be conveniently provided with an internal circulation system, realized for example in the form of a perforated pipe, connected, as a way of example but not limiting, in its superior inlet mouth to a delivery pipe or to a re-circulation duct connected to a pump, from which said perforated pipe will aspirate clear must, and finalized to generate a more intense and turbulent hydraulic circulation inside the same basket 43 and therefore to increase the efficiency and the speed of transfer of the starch from the malts contained in it.

In accordance with the present invention, it has to be noted that the plant described, in the embodiment of the segment of plant of mashing 31 illustrated in FIG. 1 and FIG. 2, allows to reduce both the maximum saccharification temperatures (activation of the enzymes destined to the conversion of the starches in simple sugars and amino acids), of approximately 35° C., and—as a consequence—the necessary times to reach the saccharification.

This has been widely demonstrated with tests on a prototype plant. The test compares the functioning of a plant in accordance with the invention (Test C1, C02, C03) both with traditional plants (B1 and B2) and with the segment of plant of mashing realized according to the realization variant illustrated in FIG. 6 and FIG. 7, which envisages the presence of the basket 43 of containment of the malts (C2, C5, C6, C7, C8, C9 e C10). As illustrated in FIG. 8, the experimentation validly shows the significant reduction of the saccharification temperature, and, despite this, it is interesting to note that, actually, the CO2 test shows a saccharification temperature of 76° C., totally analogous with the one observed in the different tests from CO1 to CO3, the only difference with respect to the other two said tests being the average Number of Cavitation (NC) before the saccharification itself, which for the test CO2 is much greater since the same test has been conducted with an additional hydraulic pressure on average equal to 1.5 bar. Therefore, as shown in FIG. 8A, relatively to the graphic Temperature—Number of Cavitation, is founa a preferred range of number of cavitation 0.15<NC<0.20 in order to optimize precisely such lowering of the saccharification temperature. Equivalently, said interval implies the opportunity, preferred but not limiting, for the greater efficiency of saccharification, to operate the process at atmospheric pressure, that is with open segment of plant 31. A hypothesis, feasible but not limiting, is that excessively violent cavitation regimes, as the ones activated in the CO2 test through application of additional hydraulic pressure, are harmful for the enzymes, that is that they inhibit the action thereof, delaying the completion of the saccharification.

Figure 9:
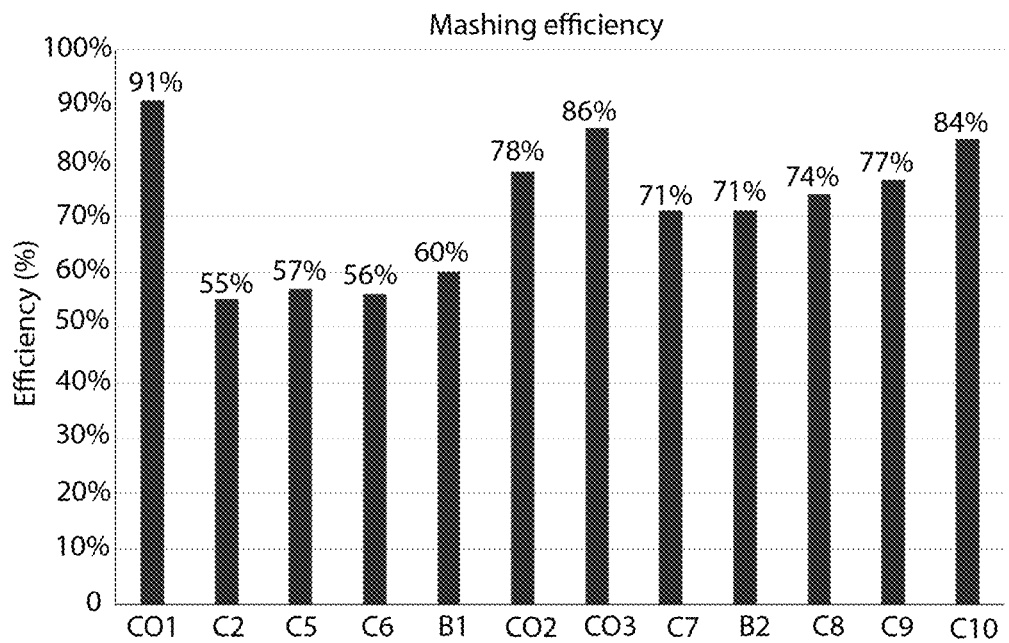
Figure 9A:
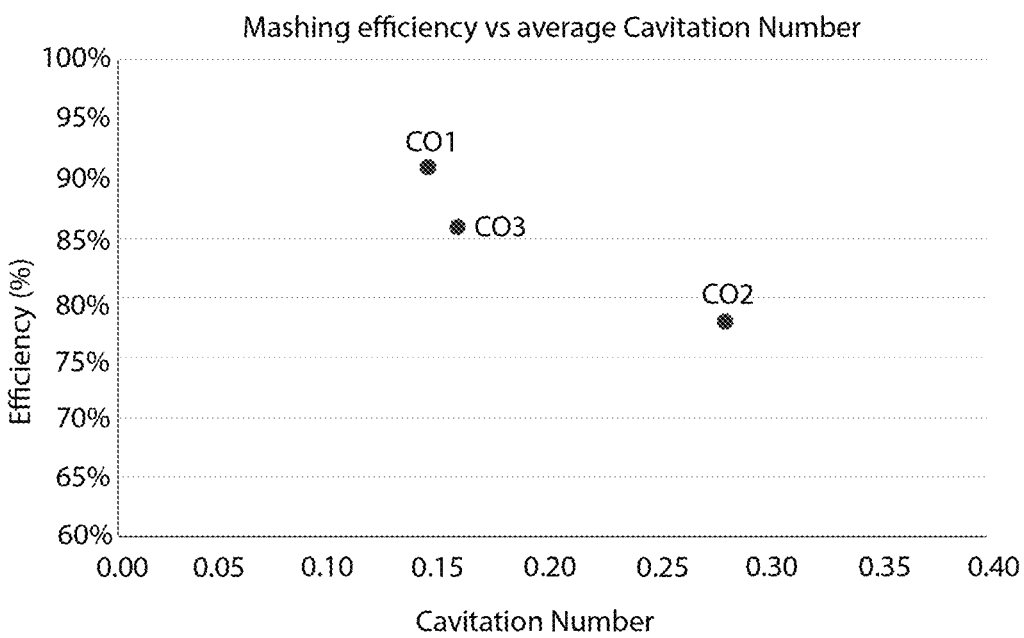

Analogous results to those relative to the saccharification temperature are found with respect to the efficiency of mashing, that is the efficiency of extraction of the starch from the malts, as illustrated in FIGS. 9 and 9A. Also in this case, for the purposes of the more efficient extraction of the starch, it is found a preferred range of number of cavitation 0.15<NC<0.20 and therefore the opportunity, preferred but not limiting, of operating the process at atmospheric pressure, that is with open segment of plant 31. Still in FIG. 9, it is interesting to note that the efficiency of mashing obtained in the C10 test has been only slightly inferior to that of the CO3 test. The explanation is that in the C10 test, executed by means of the realization variant illustrated in FIG. 6 and FIG. 7, an internal circulation to the basket 43 has been activated, particularly intense and turbulent according to the method described above, which has favored the transfer of the starch from the malts. Nevertheless, the time needed to obtain said high efficiency of mashing in the C10 test has been almost the double—as well as the energy consumed—with respect to the CO1 and CO3 tests, so that also for the purposes of the greater overall efficiency of the process, until the moment of the extraction of the malts ("mashing-out"), the use of the segment of plant 31 seems convenient in the realization form illustrated in FIG. 1 and FIG. 2.

The extraction and the isomerization of the α-acids of the hops, finalized at the conferment of the bitter taste and the flavor of the beer, are evaluated quantitatively by means of the so-called use factor of the α-acids themselves, well known in the field of the processes for the production of beer. FIG. 10 shows the results of the use of the α-acids during the last five tests, designed and executed specifically to study this process and in which only the Perle hop has been used, whose fraction in mass of α-acids is equal to 7.6%. All the tests conducted and realized by means of the plant of FIG. 1 represented, that is IBU1, IBU2, IBU3 and IBU5, achieve use factors around 30% right before the boiling point, at temperatures generally comprised between 100° C. and 102° C. in the musts of beer, with the greater part of the increase of efficiency beyond the temperature of 90° C., moreover independently from the cavitation regime, therefore from the operative hydraulic pressure. It is a result that is also shared by all the other tests conducted with the same apparatus, even if employing different hops or different combinations of hops. Such efficiency (around 30%) clearly exceeds the maximum one obtained during the IBU4 test, conducted with the traditional apparatus "Braumeister B-50", which at the initial moment of the boiling reached only 21%, with a maximum difference with respect to the tests of 11% (21% versus 32%). Moreover, the use factor obtained in the IBU1, IBU3 and IBU5 tests, in which the hops were inserted from the beginning of the relative processes, that is at temperatures of the water around 20° C., reached values relatively high already at low temperatures, up to 12% at 40° C. and up to 18% at 54° C., while at this last temperature the same use factor was limited to only 5% in the IBU4 test. Subsequently, with the growth of the temperature, the use factor did not grow anymore or even regressed down to around 80° C., probably due to the degradation of the iso-x-acids. With the further growth of the temperature, the use factor grew again very quickly up to the boiling point. In the IBU2 test, in which the hops were inserted at the temperature of 78° C., the use factor grew quickly, obtaining the greatest value at all, equal to 32% at the boiling point and demonstrating that it is anyway convenient to insert the hops after the removal of the malts.

As shown in the graphic of FIG. 10A, moreover, it is found in an evident manner that the IBU4 test, realized by means of the traditional apparatus B-50 and therefore purely thermal, it is possible to obtain, last, a use factor equal to the average one of the other tests, conducted and realized by means of the plant of FIG. 1 represented, but only adding to the preceding phase that of boiling, at a temperature of around 102° C., for about 60 minutes. In conclusion, for the purposes of the greater efficiency of the phase of hopping, it is found that it is convenient to use the segment of plant represented in FIG. 1 and in FIG. 2, it is possible to operate with said open apparatus and therefore under atmospheric pressure, it is convenient to introduce the hops at temperatures preferably but not limiting comprised between 78° C. and 90° C., while it is convenient not to execute any boiling of the must, therefore to stop the phase of hopping at the reaching of the boiling point.

Figure 11:
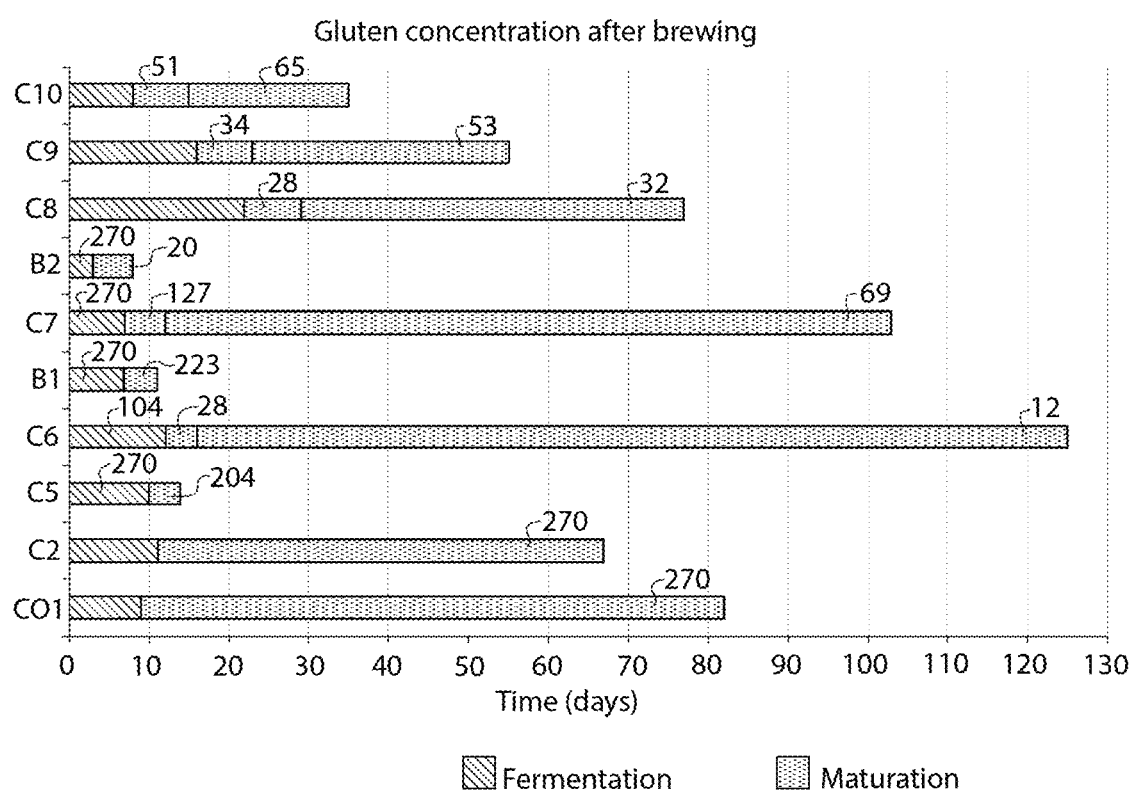

Surprising results have been found with respect to the concentration of gluten in the finished beers produced by means of the segment of plant 31, as illustrated in FIG. 11. On the basis of the tests done on barleys at 100%, preferred but not limiting operative criteria and ranges have also been found, finalized at reducing the concentration of gluten.

In the subsequent phase of extraction of the malts and previous to the insertion of the hops or anyway of the cooling at the end of the hopping, for the purposes of the reduction of the gluten under the threshold "gluten-free" equal to 20 mg/liter (or equivalently, 20 ppm), it has been found convenient, both for the energetic efficiency and for the process times, to activate a cavitation regime (CHC) characterized by Number of Cavitation (NC) equal on average to at least 0.3 and preferably but not limiting comprised in the range 0.25<NC<1 at temperatures T preferably but not limiting comprised in the interval 70° C.<T<74° C., obtainable through application of an additional hydraulic pressure, for a time corresponding to a CE energetic consumption preferably but not limiting comprised in the range 0.12 kWh/liter<CE<0.17 kWh/liter. Alternatively, in the same phase, for the purposes of the reduction of the gluten under the threshold "very low concentration of gluten" equal to 100 mg/liter (or, equivalently, 100 ppm), it is possible to activate a CHC regime characterized by Number of Cavitation corresponding to the atmospheric pressure, to temperatures T preferably but not limiting comprised in the range 70° C.<T<74° C., for a time corresponding to the energetic consumption preferably but not limiting comprised in the interval 0.22 kWh/liter<CE<0.29 kWh/liter.

Maintaining what has been said above on the application, preferably alternative but also consecutive, of said CHC regimes in cooking phase before the fermentation phase, it is advisable to execute a CHC process in the period immediately subsequent to the inoculation of the yeasts, under atmospheric pressure and at the normal temperatures of the must in fermentation, for a time $t_1$ preferably but not limiting comprised in the interval 20 min<$t_1$<45 min. In this last case, for the purposes of the decay of the concentration of gluten, the permanence of the must of beer in the tank of fermentation is advisable for a time $t_2$, preferably but not limiting superior to 20 days ($t_2$>20 days).

If the must has been pre-treated according to above mentioned indications, in particular in the phase preceding the inoculation of the yeasts (70° C.<T<74° C.), it has been surprisingly found that it is possible to envisage the moment in which the concentration of gluten desired is obtained during the phase of maturation, subsequent to the phase of fermentation and executed, for example, in bottles, barrel or other tanks, on the basis of the equation (2):

$$\text{Conc} = A \cdot t^p \qquad (2)$$

where Conc is the concentration of gluten (in unit mg/liter), A is a multiplicative coefficient (A>0) and p is the exponent of the time of maturation t expressed in days (p<0). The values of the parameters A and p can be determined experimentally for each specific combination of recipe and modality of process, also on the basis of two single values of the concentration of gluten at as many different instants, preferably but not limiting separate one from the other one of at least 7 days, in order to predict the necessary time for reaching the threshold desired of the concentration of gluten.

The equation (2) is inventive because it is specific, and applicable, preferably, for the case of pre-treatment of the must of beer through the inventive apparatus according to said indications.

The invention claimed is:

1. A method of producing beer comprising the following steps:
   mashing a mix of a liquid and of malt or grains to produce a wort by,
   arranging the mix inside a tank, and
   moving, through a pump, said mix along a closed circulating path, said closed circulating path being formed by a circulating path connected to the tank so as to cause the mix to move from the tank along said circulating path and to direct the mix again inside the tank for all of a time in which the pump is maintained activated,
   wherein said circulating path comprises at least one cavitation reactor configured to generate hydrodynamic cavitation with a subsequent increase in temperature of the mix to a predetermined temperature level;
   hopping the wort by,
   introducing, in the wort, a pre-determined quantity of hops, and
   moving, through a second pump, the wort and of the hops along a second circulating path,
   wherein the second circulating path comprises at least one second cavitation reactor configured to generate the hydrodynamic cavitation and increase the temperature of the wort in accordance with a pre-determined protocol;
   cooling and fermenting the wort after hopping by adding a yeast; and
   maturing the fermented wort.

2. The method, as per claim 1, wherein the steps of the method are activated electromechanically.

3. The method, as per claim 1, wherein the malt or grains are in uncrushed condition.

4. The method, as per claim 1, wherein the malt or grains are in crushed condition and held within a basket made of a perforated mesh.

5. The method, as per claim 1, further comprising the step of filtering the wort after mashing.

6. The method, as per claim 1, wherein the second circulating path is a second closed circulating path connected to a second tank so as to cause the wort and the hops to move from the second tank along the second closed circulating path and to return to the second tank for all of a time, during which the second pump is active.

7. The method, as per claim 1,
   wherein mashing and hopping are performed in the same tank, and
   wherein the pump and the second pump are the same pump, the circulating path and the second circulating path are the same circulating path, and the at least one cavitation reactor and the at least one second cavitation reactor are the same cavitation reactor.

8. The method, as per claim 1,
   wherein mashing and hopping are performed in separate tanks, and
   wherein the pump and the second pump are different pumps, the circulating path and the second circulating path are separate circulating paths, and the at least one cavitation reactor and the at least one second cavitation reactor are separate cavitation reactors.

9. The method, as per claim 1, further comprising the step of maintaining the predetermined temperature level by providing a cooling system of the tank that comprises a wet sleeve that surrounds the tank or a cooling coil within the tank.

* * * * *